US005513443A

United States Patent [19]

Hatfield

[11] Patent Number: 5,513,443

[45] Date of Patent: May 7, 1996

[54] DRYER FOR AGGREGATE AND RECLAIMED ASPHALT PRODUCTS

[75] Inventor: Robert J. Hatfield, Fremont, Ind.

[73] Assignee: Asphalt Drum Mixers, Inc., Huntertown, Ind.

[21] Appl. No.: 372,766

[22] Filed: Jan. 13, 1995

[51] Int. Cl.$^{6}$ .............................. F26B 25/00; G11B 5/02

[52] U.S. Cl. .............................. 34/106; 432/111; 360/25

[58] Field of Search .............................. 34/132, 135, 136, 34/137; 110/128, 129, 101 CC, 226; 432/105, 109, 111, 118; 366/24, 25

[56] References Cited

U.S. PATENT DOCUMENTS

| | | | |
|---|---|---|---|
| Re. 31,904 | 6/1985 | Mendenhall . | |
| Re. 31,905 | 6/1985 | Mendenhall . | |
| 4,147,436 | 4/1979 | Garbelman et al. . | |
| 4,298,287 | 11/1981 | McCarter, III et al. | 366/25 X |
| 4,338,732 | 7/1982 | Coxhill | 366/57 X |
| 4,339,998 | 7/1982 | Finch | 110/101 CC X |
| 4,361,406 | 11/1982 | Loggins, Jr. et al. | 366/25 |
| 4,422,848 | 12/1983 | Musil | 432/118 |
| 4,477,250 | 10/1984 | Brashears et al. . | |
| 4,787,938 | 11/1988 | Hawkins . | |
| 4,797,002 | 1/1989 | Heap . | |
| 4,813,784 | 3/1989 | Musil . | |
| 4,867,572 | 9/1989 | Brock et al. . | |
| 4,892,411 | 1/1990 | Elliott et al. . | |
| 4,940,334 | 7/1990 | Musil | 432/118 X |
| 4,946,283 | 8/1990 | Musil . | |
| 5,002,398 | 3/1991 | Musil . | |
| 5,052,809 | 10/1991 | Young | 34/137 |
| 5,054,931 | 10/1991 | Farnham et al. . | |
| 5,090,813 | 2/1992 | McFarland et al. . | |
| 5,174,650 | 12/1992 | McFarland et al. . | |
| 5,294,197 | 3/1994 | Prill et al. . | |
| 5,320,426 | 6/1994 | Keylon et al. | 366/25 |
| 5,364,182 | 11/1994 | Hawkins | 432/109 X |
| 5,378,059 | 1/1995 | Brock | 366/25 X |

OTHER PUBLICATIONS

Chapter 3, Natinal Asphalt Pavement Association, 1987 "The Fundamentals of the Operation and Maintenance of the Exhaust Gas System in an Hot Mix Asphalt Facility".

Jan., 1995 edition, "Asphalt Contractor" Tarmac Products advertisement in 'Asphalt Contractor'.

*Primary Examiner*—Hoang Nguyen

*Attorney, Agent, or Firm*—George Pappas

[57] ABSTRACT

A dryer for use in an asphalt plant for heating and drying virgin aggregate and also pre-heating reclaimed asphalt products (RAP). A drying drum cylinder having a burner at one end heats and dries virgin aggregate traveling therethrough. A second cylinder near the burner surrounds the drying drum and creates an annular cavity. RAP is introduced and travels through the annular cavity and exits adjacent the drying drum aggregate exit opening. Heat given off by the drying drum increases the temperature within the annular cavity and heats the RAP traveling therethrough. Heated aggregate and RAP first come in contact with one another after exiting the annular cavity and the drying drum and are, thereafter, delivered to a mixing drum.

25 Claims, 6 Drawing Sheets

DRYER FOR AGGREGATE AND RECLAIMED ASPHALT PRODUCTS

TECHNICAL FIELD

The present invention relates to the technical field of asphalt plants for manufacturing asphalt pavement products. More specifically, the present invention relates to an improved dryer utilized in an asphalt plant for heating and drying aggregate which is then used in the asphalt plant for making asphalt.

BACKGROUND OF THE INVENTION

Asphalt is presently commonly used for paving streets and highways, tennis courts, driveways, and other outdoor and indoor surfaces. Asphalt pavement has proven to be generally inexpensive to manufacture and install and yet substantially durable for withstanding heavy loads, such as heavy trucks and for withstanding severe outdoor elements. Asphalt plants can be stationary or mobile as may economically be needed for manufacturing and delivering hot asphalt a reasonable distance whereat it is installed with paving equipment.

The production of asphalt first requires preheating of the aggregate to a desired temperature, typically 200–800 degrees Fahrenheit. During this heating process, substantially all moisture is removed from the aggregate. Thereafter, the hot aggregate is mixed with tar for creating the asphalt. Typically, a separate mixing drum is provided for mixing the aggregate and tar although some asphalt plants incorporate a single drum having a heating/drying section and a mixing section.

During repaving and other construction operations, reclaimed asphalt pavement or products (RAP) is created and requires the disposal or reuse thereof. Due to environmental hazards and high costs of disposal, it is undesirable to merely landfill the RAP. It is obviously more desirable to reuse such reclaimed asphalt products thereby eliminating disposal costs while increasing productivity. Similar to the process using virgin aggregate, however, the RAP must first be heated for properly mixing with additional tar and aggregate and thereby manufacturing a correctly mixed useable asphalt.

In the past, RAP has typically been introduced directly into the mixing drum or mixing area along with the hot aggregate and tar. Unfortunately, such a method requires that the aggregate be heated to a much higher temperature so as to compensate for the cold RAP. Additionally, such method requires substantially more mixing so that the RAP can first be heated and thereafter be properly mixed.

Attempts have been made to introduce RAP directly into the aggregate drying drum. However, this is problematic in that, quite often, the RAP begins to liquify thereby dirtying the aggregate drying drum and reducing its efficiency. Additionally, the heating of RAP creates hydrocarbon, carbon monoxide and nitrogen oxide emissions which are unacceptable and must be treated prior to releasing to the atmosphere.

In yet another attempt to pre-heat RAP, a collar has been incorporated circumscribing the aggregate drying/heating drum and a plurality of holes placed in the drying drum for allowing the heated aggregate to fall out of the drying drum and into the outer collar. RAP is introduced into the collar and, therefore, the RAP and aggregate are caused to mix within the annular area between the collar and the drying drum. In these apparatus, although the RAP is preheated and mixed with aggregate prior to being introduced into the mixing drum, similar to merely introducing the RAP directly into the drying drum, hydrocarbons, carbon monoxide and nitrogen oxide emissions are again emitted into the drying drum and require treatment for meeting EPA standards. Additionally, the portion of the drying drum after the aggregate falls out of the drying drum and into the collar is exposed to direct heat from the burner. This unfortunately overheats the drying drum causing deterioration and warpage thereof.

Accordingly, a need exists for an apparatus and method whereby RAP can be preheated efficiently and economically in asphalt plants without damaging the asphalt plant components and without creating undesirable emissions.

SUMMARY OF THE INVENTION

It is the principal object of the present invention to overcome the above-discussed disadvantages associated with prior asphalt plants.

The present invention overcomes the disadvantages associated with prior asphalt plants by providing a cylindrical dryer drum (also referred to herein as a drying drum) generally horizontally disposed and adapted for rotating about its longitudinal axis. Virgin aggregate is introduced into the drying drum at an opening at its first end, travels through the drying drum and, thereafter, exits at a second opening at the other or second end thereof. A heat source such as a gas or oil burner is provided at the drying drum second end for blowing hot air directly into the drying drum. Mixing paddles are provided along the length of the drum for lifting and dropping the virgin aggregate in the path of the flowing hot air and gases.

A second cylinder is provided circumscribing the dryer drum and rotating about its longitudinal axis along with the drying drum. The second cylinder is located at the second end of the dryer drum near the burner whereat the dryer drum tends to be the hottest. An annular cavity is thus created between the second cylinder and the dryer drum. An inlet to the annular cavity is provided at a distance from the dryer drum second end toward the dryer drum first end. The inlet is accessible through a shroud circumscribing and straddling the dryer drum and the second cylinder. A hatch is provided on the shroud and is selectively openable. Accordingly, recycled asphalt products can be selectively introduced into the annular cavity by opening the hatch and dropping the RAP directly into the annular cavity opening. A trap door is also provided just forward of the annular cavity opening and is adapted to open only when RAP is introduced therein.

The annular cavity extends back substantially to the second end of the dryer drum without any openings in the dryer drum to the annular cavity. An outlet to the annular cavity is provided adjacent the dryer drum second end opening whereat the heated virgin aggregate falls out therefrom. Here, a back shroud is provided and encloses both the second opening of the dryer drum and the annular cavity outlet. The back shroud includes an outlet wherethrough heated aggregate and RAP exit.

Accordingly, RAP is preheated by opening the reclaim shroud hatch and dropping the RAP directly into the annular cavity opening. The RAP travels longitudinally in the annular cavity toward the outlet thereof. During this longitudinal movement of the RAP, the excess heat given off by the dryer drum and traveling into the annular cavity causes the RAP to also be heated. The temperature inside the drying drum, the quantity of virgin aggregate and RAP as well as the longitudinal length of the second cylinder, etc., are controlled and sized properly so that the RAP traveling through the annular cavity is not overheated thereby preventing the creation of hydrocarbon, carbon monoxide, and nitrogen oxide emissions and not allowing the RAP to become sticky.

The first point of contact between the RAP and virgin aggregate occurs in the back shroud after falling out of the respective dryer drum and annular cavity. The dryer drum is therefore not left totally exposed directly to the burner flame and heat and warpage thereof is eliminated while heat transfer efficiency is increased. Lifting paddles are provided and rotate with the dryer drum for lifting the hot aggregate and RAP in the back shroud to and out through the back shroud outlet.

In one form thereof, the present invention is directed to a dryer for heating and drying aggregate and heating reclaimed asphalt products. The dryer includes a first cylindrical drum adapted for rotating about its longitudinal axis and having a first opening at one longitudinal end and a second opening at its other longitudinal end. The aggregate is introduced through one of the openings, travels through the drum, and exits through the other of the openings. A heat source is provided at one end of the first cylindrical drum for providing heat into the drum and heating the aggregate as it travels therethrough. A second cylinder is provided and is coaxial with and at least in part surrounds the first cylindrical drum thereby forming an annular cavity between the first cylindrical drum and the second cylinder. The second cylinder is adapted for rotating about its longitudinal axis. The annular cavity has an inlet and an outlet whereby reclaimed asphalt products are introduced into the annular cavity through the inlet, travel through the annular cavity whereat they are heated and exit the annular cavity through the outlet.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF THE PREFERRED EMBODIMENT

Figure 1:
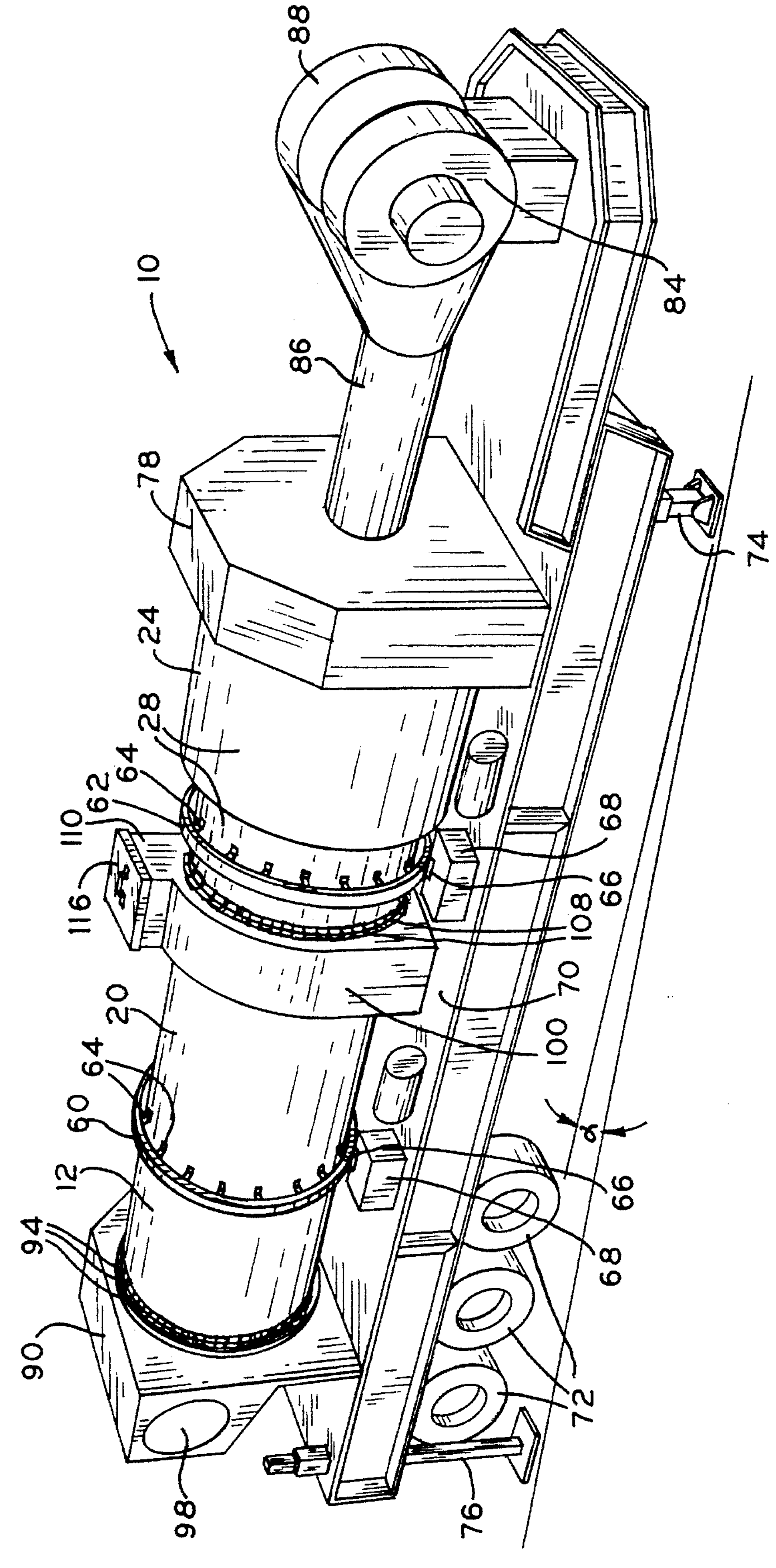
FIG. 1 is a perspective view of a dryer drum for use in an asphalt plant and which is constructed in accordance with the principles of the present invention.
Figure 2:
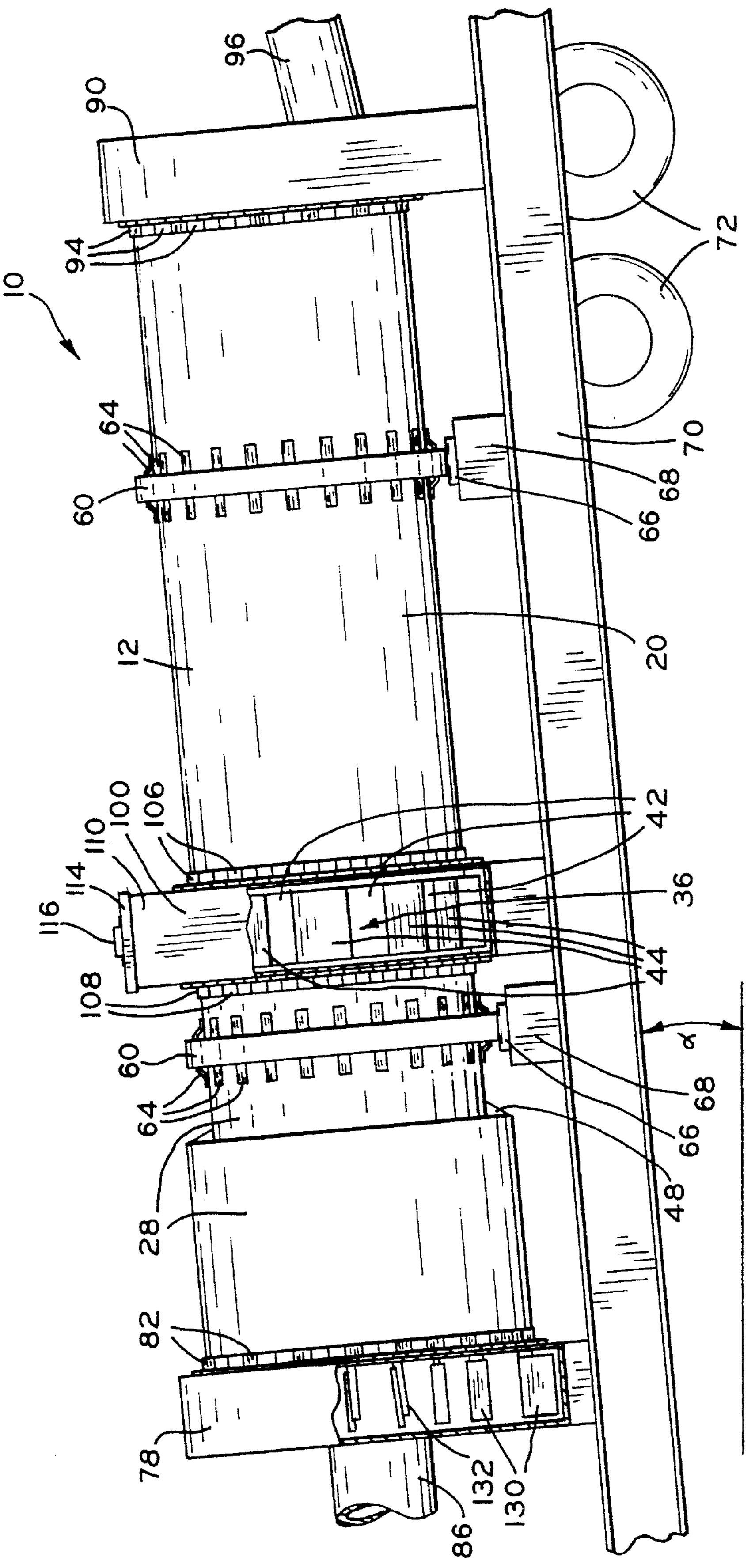
FIG. 2 is a side elevation view of the dryer shown in FIG. 1 with cut-away sections at the reclaim shroud and the back shroud.
Figure 3:
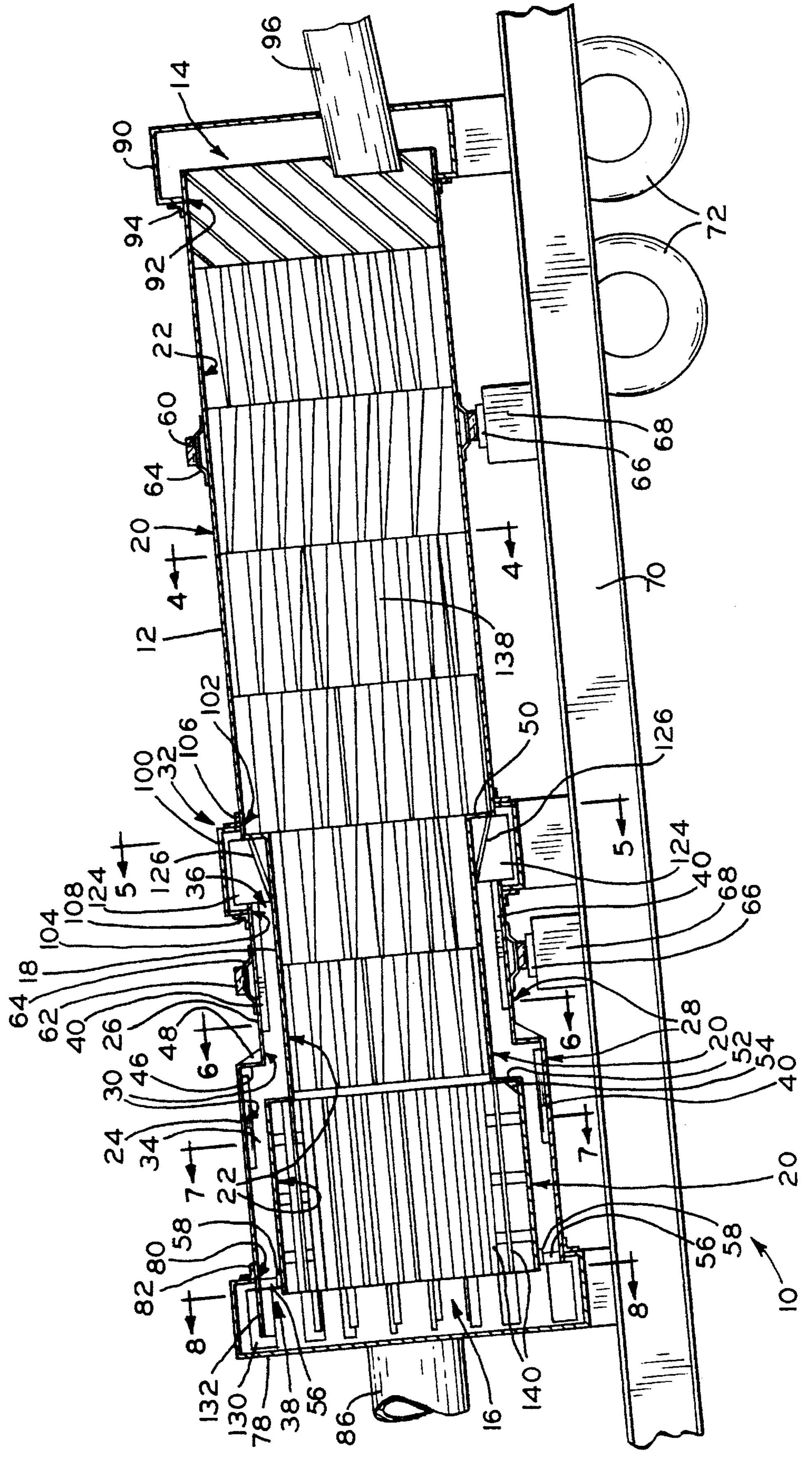
FIG. 3 is a longitudinal cross sectional view of the dryer shown in FIG. 1.

Referring initially to FIGS. 1–3, there is shown a dryer generally designated by the numeral 10 which is constructed in accordance with the principles of the present invention. Dryer 10 is one component of an asphalt plant and, as more fully discussed hereinbelow, operates to heat and dry virgin aggregate and to pre-heat RAP for use thereafter in a mixing drum (not shown) for further mixing with tar and producing asphalt.

Dryer 10 includes a dryer drum cylinder 12 having a first opening 14 at one longitudinal end and a second opening 16 at its other longitudinal end. Dryer drum 12 includes a reduced diameter or radial portion 18 and has an outer surface 20 and an inner surface 22. A second cylinder 24 is provided surrounding and being coaxial with the first dryer drum cylinder 12. Second cylinder 24 also includes a reduced diameter or radial portion 26 generally located around reduced diameter portion 18 of dryer drum 12. Second cylinder 24 has an outer surface 28 and an inner surface 30. Second cylinder 24 extends longitudinally starting adjacent the longitudinal end of dryer drum 12 at the second opening 16 to an area generally designated by the numeral 32. Preferably, second cylinder 24 extends longitudinally 10% to 70% of the total longitudinal length of the dryer drum 12.

As best shown in FIG. 3, an annular cavity 34 is defined between dryer drum cylinder 12 and second cylinder 24 and between respective surfaces 20 and 30 of the dryer drum 12 and the second cylinder 24. Annular cavity 34 includes an inlet 36 at one longitudinal end and an outlet 38 at its other longitudinal end. Outlet 38, as shown is adjacent second opening 16 of dryer drum 12. A plurality of agitating paddles 40 are affixed to the inner surface 30 of second cylinder 24 and, as more fully discussed hereinbelow, are provided for agitating and moving RAP traveling through the annular cavity 34.

Second cylinder 24 is connected to and rotates about its longitudinal axis along with dryer drum 12. In this regard, in constructing second cylinder 24, dryer drum 12 and reduced diameter portion 26 of the second cylinder 24 are initially preferably one integral cylinder and, as best shown in FIG. 2, a plurality of holes 42 are cut therein and leaving support members 44 therebetween. Thus, reduced diameter portion 26 is rigidly attached to dryer drum 12 via support members 44. At the other end of reduced diameter portion 26, an annular ring 46 is affixed thereto by welding or other suitable means and triangular ribs 48 are provided for added stability. At the outer perimeter of annular ring 46, the back portion of second cylinder 24 is affixed also by welding or other suitable means.

Starting just forward of holes 42, an annular ring 50 is provided and is affixed between dryer drum 12 and reduced diameter portion 18. A second annular ring 52 is provided at the other end of reduced diameter portion 18 and is affixed between the reduced diameter portion 18 and the furthest back cylindrical portion of dryer drum 12. A plurality of triangular ribs 54 are also provided and are welded in place in a known and customary manner for added stability thereat.

At the furthest back longitudinal end of dryer drum 12, second cylinder 24 is retained coaxial with dryer drum 12 via a plurality of legs 56 extending radially inwardly from second cylinder 24 to feet 58. It is noted that, although legs 56 are affixed to second cylinder 24 and to feet 58, feet 58 merely frictionally engage the outer surface 20 of dryer drum 12. In this fashion, differential expansions that occur between the dryer drum 12 and second cylinder 24 are compensated for and are allowed to occur without causing potential damaging stresses.

As is now evident, second cylinder 24 is affixed to and rotates about its longitudinal axis along with dryer drum 20.

For rotating dryer drum 20 and second cylinder 24 about their longitudinal axis, a first tire 60 is provided circumscribing dryer drum 12 and affixed thereto by brackets 64 and a second tire 62 is provided circumscribing and affixed to the second cylinder reduced diameter portion 26 also via brackets 64. Tires 60 and 62 rest on rollers 66 which are, in turn, rotatably supported on roller support structures 68. Roller support structures 68 are affixed on top of mobile trailer unit 70 including wheels 72 and legs 74 and 76. It is noted that one or more of rollers 66 are rotatably driven in a known and customary manner for rotatably driving dryer drum 12 and second cylinder 24 about their longitudinal axis.

As shown in FIGS. 1 and 2, after the mobile trailer unit 70 and dryer 10 thereon is transported to a desired location, legs 74 and 76 are extended thereby supporting dryer 10. Legs 76 are extended sufficiently longer than legs 74 thereby placing mobile trailer unit 70 and the longitudinal axis of dryer drum 12 and second cylinder 24 at an angle α, preferably between 5 degrees and 20 degrees from the horizontal. It is noted that although a mobile dryer unit 10 is shown, it could just as easily be constructed so as to be permanently stationary at a stationary asphalt plant.

Back shroud 78 is provided at the dryer drum second opening 16 resting and being supported on the trailer unit 70. Back shroud 78 surrounds and encloses second opening 16 of dryer drum 12 and outlet 38 of annular cavity 34. As best shown in FIGS. 2 and 3, second cylinder 24 and dryer drum 12 extend partially within back shroud 78 through a circular opening 80. A plurality of rubber pieces 82 are affixed to back shroud 78 adjacent opening 82 and are adapted to frictionally engage the outer surface 28 of second cylinder 24. Rubber pieces 82 thus inhibit potential air flow between the atmosphere and the interior of back shroud 78 while drum 12 and second cylinder 24 rotate about their longitudinal axis.

An oil burner 84 is provided as a heat source and is adapted to deliver a flame and heat via duct 86 through back shroud 78 and into the dryer drum 12. A combustion air blower 88 is also provided and is supported on trailer unit 70. Combustion air blower 88 is adapted to provide the necessary oxygen through duct 86 or a secondary duct (not shown) so that substantially 100% combustion is achieved within back shroud 78 and dryer drum 12. Most preferably, combustion air blower 88 is sized for providing over 125% of the combustion air needed. Additionally, combustion air blower 88 is adapted on its suction side for communicating with the interior of the asphalt plant mixing drum thereby drawing hydrocarbon, carbon monoxide and nitrogen oxide emissions therefrom and directing them into the burner flame created by burner 84 and, thus, burning and properly disposing of the mixing drum emissions.

The hot gases and air being forced into the back shroud and dryer drum second opening 16 travel longitudinally through dryer drum 12 to the first opening 14 of dryer drum 12 whereat a front shroud 90 is provided and encloses first opening 14. Front shroud 90 is also supported on trailer unit 70 and includes a circular opening 92 wherethrough a portion of dryer drum 12 is received. A plurality of rubber pieces 94 are affixed to front shroud 90 adjacent circular opening 92 and, similar to rubber pieces 82, frictionally engage the outer surface 20 of dryer drum 12 and inhibit air flow from inside of dryer drum 12 and front shroud 90 to the atmosphere. An aggregate entrance tube 96 extends through front shroud 90 through first opening 14 and, in part, within dryer drum 12 for introducing virgin aggregate therethrough and into dryer drum 12. Entrance tube 96 is placed generally at an angle from the horizontal so that virgin aggregate which is typically delivered thereto by a conveyor easily slides downwardly and into the dryer drum 12. As best shown in FIG. 1, an exhaust opening 98 is also provided in front shroud 90 wherethrough hot gases and air traveling through dryer drum 12 may exit and be delivered to a bag house (not shown) whereat fines and other small particles picked up by the moving hot gases and air can be separated therefrom.

A central or reclaim asphalt products shroud 100 is also provided circumscribing and enclosing the annular cavity inlet 36 and holes 42. Reclaim shroud 100 includes a circular opening 102 circumscribing and extending over the outer surface 20 of dryer drum 12 and also includes a circular opening 104 circumscribing and extending over the outer surface 28 of the reduced diameter portion 26 of the second cylinder 24. A plurality of rubber pieces 106 are affixed to reclaim shroud 100 adjacent circular opening 102 and frictionally engage the outer surface 20 of dryer drum 12 whereas a plurality of rubber pieces 108 are affixed to reclaim shroud 100 adjacent circular opening 104 and frictionally engage the outer surface 28 of reduced diameter portion 26 of second cylinder 24. Rubber pieces 106 and 108, similar to rubber pieces 82, serve to inhibit air flow from the atmosphere to within reclaim shroud 100.

For introducing RAP into annular cavity 34, reclaim shroud 100 is provided with a duct 110 having an opening 112 at its upper end and communicating with the interior of shroud 100. Opening 112 of duct 110 is selectively opened and closed via a hatch 114 shown in FIG. 5 as a selectively removable lid incorporating a handle 116. It is contemplated that other means of selectively opening and closing the entrance to duct 110 can be provided such as pivotable doors. Within duct 110, a pair of trap doors 118 are provided and are adapted for pivoting about pivot pins 120. Counterweights 122 are connected to trap doors 118 and are adapted for pivotal motion therewith. Counterweights 122 are slightly heavier than trap doors 118 and retain trap doors 118 normally closed. However, when RAP is introduced through opening 112 and into duct 110 and falls onto trap doors 118, the weight of the RAP causes pivotal rotation of the trap doors 118 against the counterweights 122 and allowing the RAP to fall downwardly toward holes 42 and annular cavity inlet 36.

Figure 5:
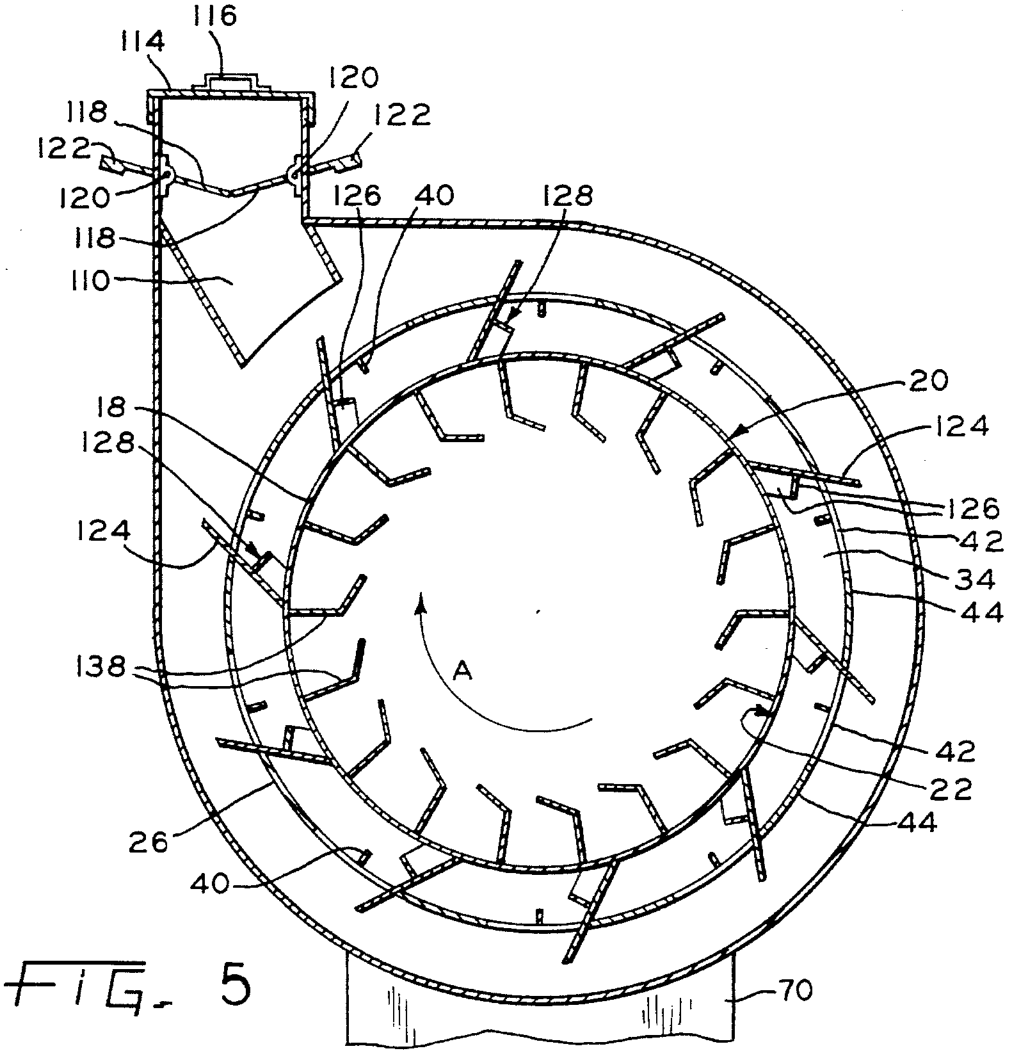
FIG. 5 is a cross sectional view of the dryer shown in FIG. 1 taken along line 5—5 of FIG. 3.
Figure 6:
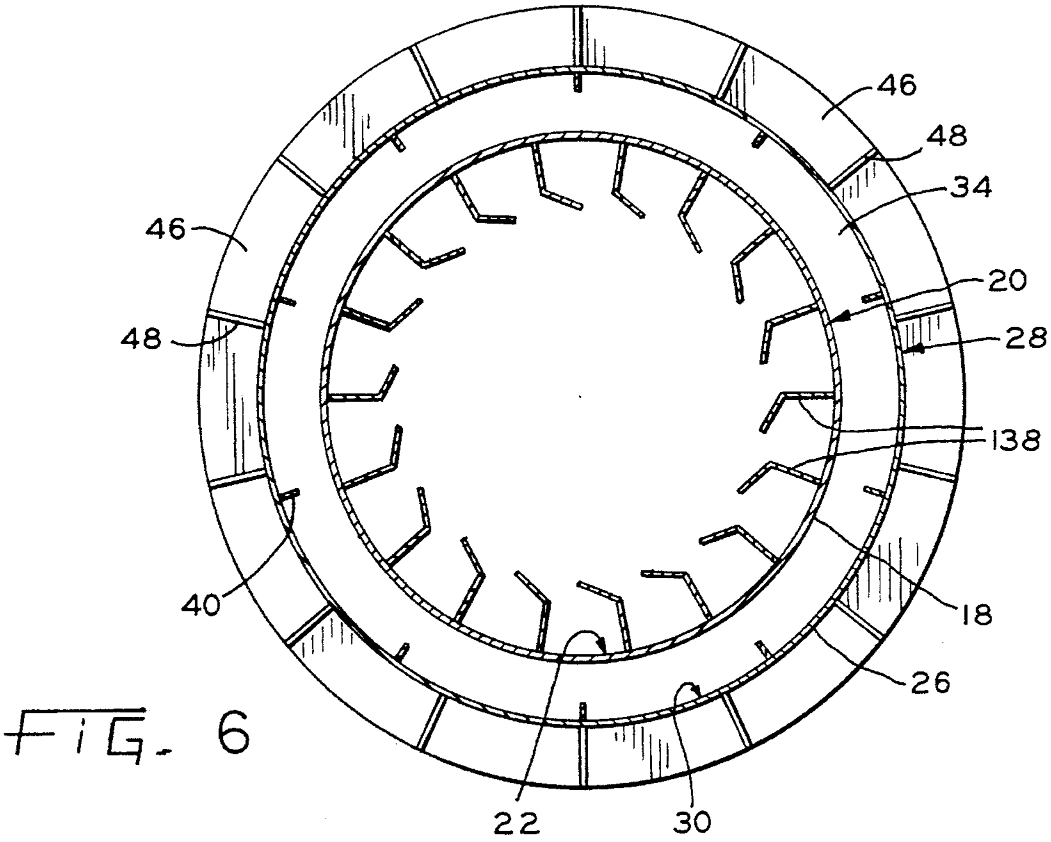
FIG. 6 is a cross sectional view of the dryer shown in FIG. 1 taken along line 6—6 of FIG. 3.

As RAP is introduced through duct 110 and into shroud 100, RAP is caused to be moved into annular cavity 34. In this regard, referring to FIGS. 3 and 5, a plurality of rectangular plates 124 are provided and are affixed to the outer surface 20 of reduced diameter portion 18 and, also, to one edge of support members 44 adjacent holes 42. As best shown in FIG. 5, rectangular plates 124 are placed at an angle with respect to reduced diameter portion 18 and reduced diameter portion 26 so that as dryer drum 12 and second cylinder 24 rotate in the direction indicated by arrow A, excess RAP falling to the bottom of shroud 100 is picked up by rectangular plates 124 and caused to fall through holes 42 into the annular cavity inlet 36.

For yet further enhancing the movement of RAP into annular cavity 34, bars 126 are provided and are affixed to rectangular plates 124 at an acute angle with respect to reduced diameter portion 18 of dryer drum 12. As best shown in FIG. 3, bars 126 along their longer edge are affixed to rectangular plates 124, at their forward end are affixed to the outer surface 20 of reduced diameter portion 18 and at their other end are affixed to annular ring 50. Accordingly, as dryer drum 12 and second cylinder 24 rotate about their longitudinal axis, RAP being scooped up by rectangular plates 124, tends to fall through holes 42 and upon the upper surface 128 of bars 126 and thereby causing the RAP to fall backwardly and into annular cavity 34.

Figure 8:
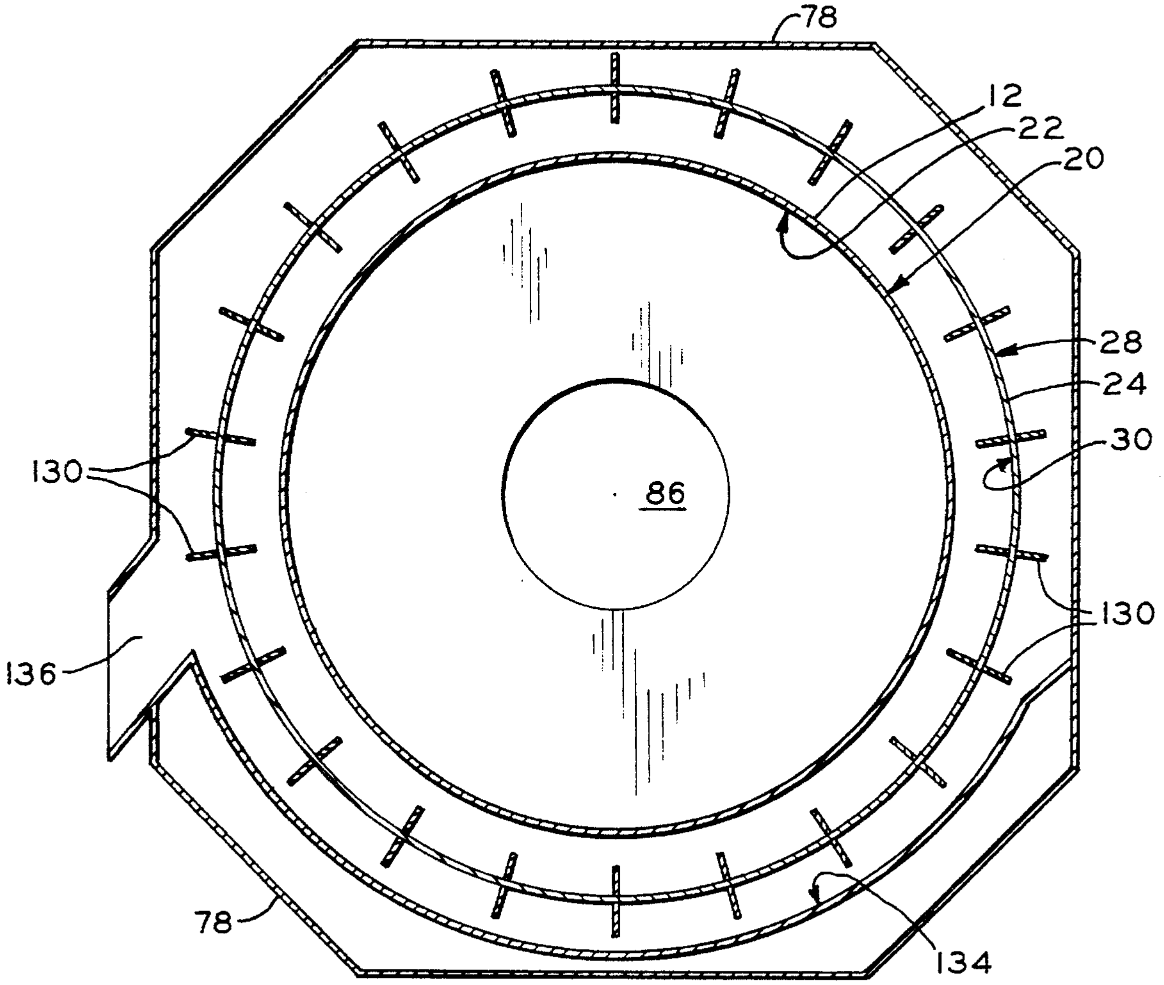

At the annular cavity outlet 38, a plurality of lifting paddles 130 are affixed to second cylinder 24 extending fingers 132. Fingers 132 can be formed integrally with second cylinder 24 or affixed thereto by welding or other suitable means. As best shown in FIG. 8, lifting paddles 130 are coplanar with planes which are generally radial from the longitudinal axis of dryer drum 12. Back shroud 78 further includes a semicircular surface 134 at its lower end thereof extending upwardly to a back shroud outlet 136. Lifting paddles 130 travel over semi-circular surface 134 and lift aggregate and RAP deposited on surface 134 up and through back shroud outlet 136.

Figure 4:
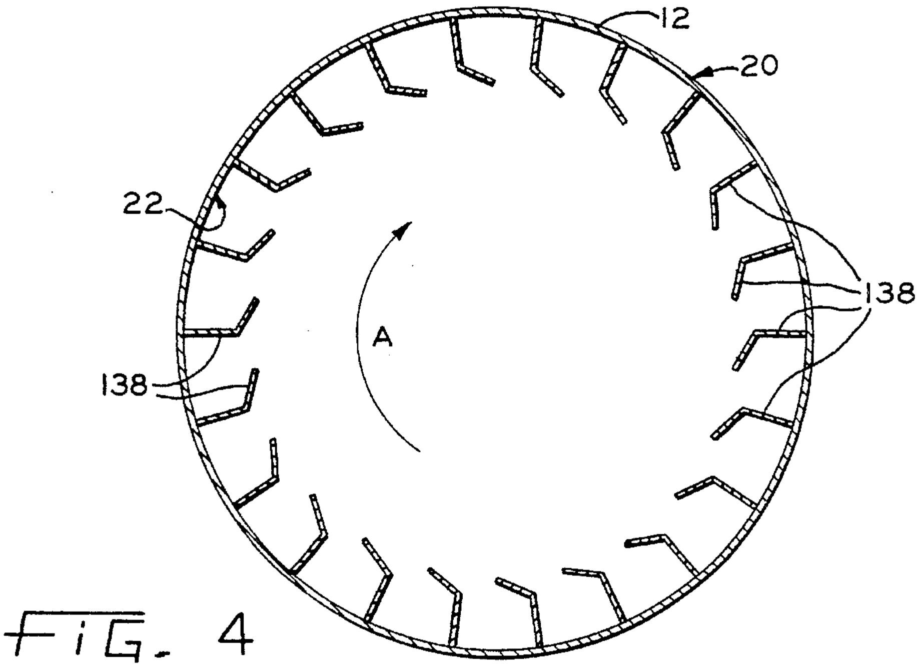
FIG. 4 is a cross sectional view of the dryer shown in FIG. 1 taken along line 4—4 of FIG. 3.

In operation, after burner 84 and combustion air blower 88 are energized and dryer drum 12 and second cylinder 24 are being rotated about their longitudinal axis, virgin aggregate is introduced through entrance tube 96 and dryer drum first opening 14 into the dryer drum. The aggregate falling into dryer drum 12 is then caused to move through dryer drum 12 toward second opening 16 in view of the drum being at an angle α with respect to the horizontal and by the various flights and paddles provided on the interior surface 22 of dryer drum 12. In this regard, as shown in FIG. 4, a plurality of flights 138 affixed to inner surface 22 of dryer drum 12 tend to lift the virgin aggregate as the drum rotates in the direction of arrow A and drop it in the path of hot flowing gases and air. This creates a "curtain" of aggregate and exposes the aggregate to the hot air and gases thereby causing the heating thereof. Additionally, any moisture contained in the aggregate is also heated and vaporized and is carried away by the combustion gases and hot air out through exhaust opening 98 and sent to the bag house.

Figure 7:
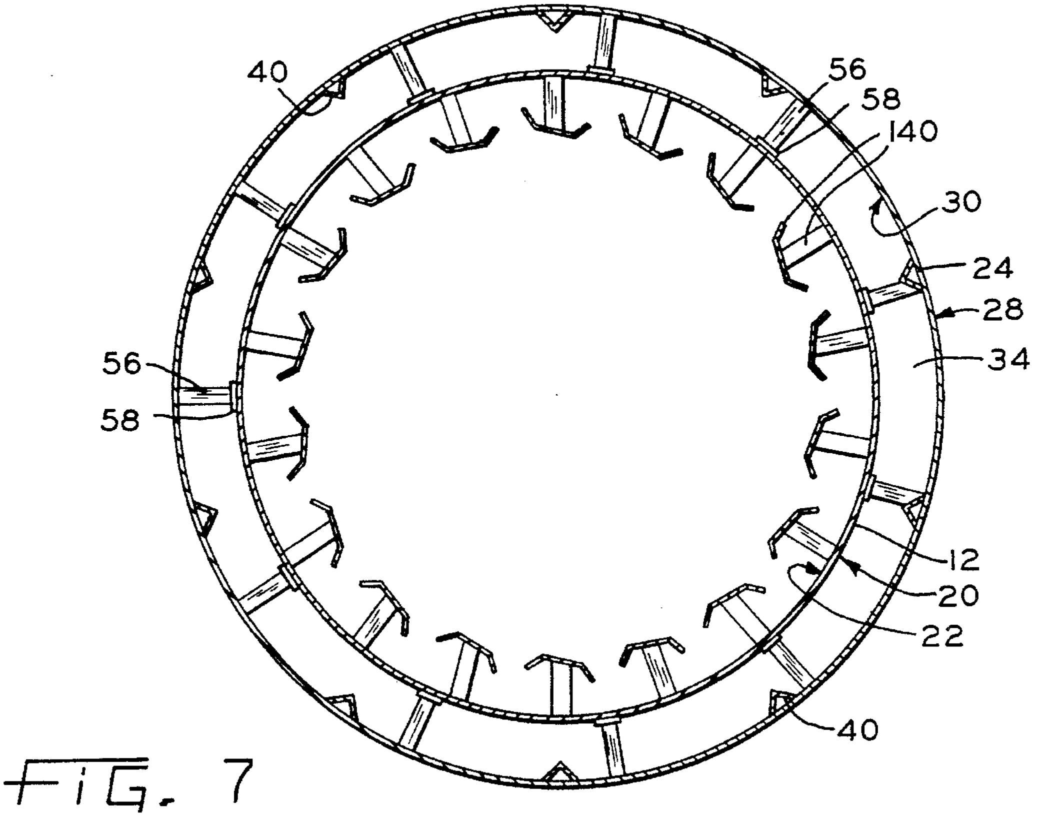
FIG. 7 is a cross sectional view of the dryer shown in FIG. 1 taken along line 7—7 of FIG. 3; and, FIG. 8 is a cross sectional view of the dryer shown in FIG. 1 taken along line 8—8 of FIG. 3.

The virgin aggregate continues through dryer drum 12 through reduced diameter portion 18 and finally near the second opening 16 whereat the dryer drum 12 is again of the same diameter. It is noted that, as shown in FIG. 7, second flights 140 are provided near second opening 16. Second flights 140 do not to lift as much of the aggregate and reduce the density of the curtain thereby allowing the burner flame to extend as may be needed into the dryer drum 12. Flights 138 and secondary flights 140 are located and fashioned in a known and customary manner for properly lifting, moving, heating and drying the virgin aggregate as it travels through the dryer drum 12. Finally, the heated and dried aggregate falls out of dryer drum 12 through its second opening 16 and onto semi-circular surface 134 of back shroud 78.

In the meantime, as discussed hereinabove, RAP is selectively introduced through opening 112 of duct 110 and is moved through holes 42 and the annular cavity inlet 36 into cavity 34. Here, similar to the virgin aggregate, the RAP moves longitudinally backwardly toward annular cavity outlet 38. However, heat given off by the dryer drum increases the temperature within annular cavity 34 thereby exposing the RAP to an elevator temperature. As the RAP travels backwardly due to the dryer drum and second cylinder being placed at an angle α with respect to the horizontal, it is agitated via agitating paddles 40 and is caused to be heated. Preferably, the RAP is heated from ambient to a temperature of 130–200 degrees Fahrenheit. Similar to the aggregate, the RAP exiting annular cavity 34 through outlet 38 falls onto the semi-circular surface 134 of back shroud 78 whereat it first comes into contact with the aggregate. As lifting paddles 130 then rotate and travel over semi-circular surface 134, they lift both the aggregate and RAP upwardly and out through back shroud outlet 136 wherefrom the heated aggregate and RAP may be delivered to a mixing drum for mixing with tar and creating asphalt.

It is noted that all of the various components and parts of the dryer 10 described hereinabove are made of steel unless otherwise specifically noted. Additionally, although dryer 10 is referred to as a "dryer", this is only because this word is the general term used in the art and because the virgin aggregate is typically not only heated, but also dried. However, "dryer" as used herein is not intended to only encompass drying or the removal of moisture, but also merely heating aggregate and RAP to a certain temperature without removal of moisture therefrom.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A dryer for heating and drying aggregate and heating reclaimed asphalt products, said dryer comprising:

a first cylindrical drum adapted for rotating about its longitudinal axis and having a first opening at one longitudinal end and a second opening at its other longitudinal end, said aggregate being introduced through said first opening, travels through said drum, and exits through said second opening;

a heat source providing heated gases into said drum through said second opening and heating said aggregate as it travels through said drum;

a second cylinder being coaxial with and, at least in part, surrounding said first cylindrical drum and forming an annular cavity between said first cylindrical drum and said second cylinder, said second cylinder adapted for rotating about its longitudinal axis;

said annular cavity having an inlet and having an outlet adjacent said first drum second opening; and, a back shroud at said first drum second end enclosing said first drum second opening and said annular cavity outlet and having a shroud outlet; and, wherein reclaimed asphalt products are introduced into said annular cavity through said inlet, travel through said annular cavity whereat they are heated without contacting said heated gases, and exit said annular cavity through said outlet adjacent heated aggregate exiting said first drum second opening, whereby said heated aggregate and reclaimed asphalt first come in contact with one another in said shroud and thereafter exit said back shroud through said shroud outlet.

2. The dryer of claim 1 wherein said second cylinder surrounds said first drum generally from said first drum second opening towards but short of said first drum first opening.

3. The dryer of claim 1 wherein said second cylinder surrounds said first cylindrical drum generally from said first drum second opening to an inlet area located between 10% and 70% of the first drum longitudinal length.

4. The dryer of claim 3 further comprising a reclaim asphalt shroud circumscribing and enclosing said annular cavity inlet, a selectively openable hatch provided on said shroud wherethrough reclaimed asphalt products may be supplied to said annular cavity through said cavity inlet.

5. The dryer of claim 4 wherein said reclaim asphalt shroud straddles said annular cavity inlet and frictionally engages said second cylindrical drum and said first cylindrical drum, thereby inhibiting air flow between the atmosphere and said annular cavity.

6. The dryer of claim 4 wherein said reclaim asphalt shroud further includes a duct between said hatch and said annular cavity inlet and a trap door pivotally mounted in said duct adapted to open when reclaimed asphalt products are supplied into said duct.

7. The dryer of claim 6 wherein said trap door includes a counterweight for keeping said door normally closed, and wherein the weight of reclaimed asphalt products on said trap door causes the door to pivot and open.

8. The dryer of claim 6 further comprising means at said annular cavity inlet for moving reclaimed asphalt products introduced thereat longitudinally toward said annular cavity.

9. The dryer of claim 6 further comprising cavity paddles in said annular cavity for lifting reclaimed asphalt products therein as said first cylindrical drum and said second cylinder rotate.

10. The dryer of claim 4 further comprising a plurality of lifting paddles rotating with said first drum and said second cylinder and extending into said back shroud, a semi-circular surface located in said back shroud, whereby heated aggregate and reclaimed asphalt products fall onto said semi-circular surface and are lifted by said lifting paddles to and out through said back shroud outlet.

11. The dryer of claim 4 wherein said second cylinder is attached to and rotates with said first cylindrical drum.

12. The dryer of claim 4 wherein said second cylinder surrounds 20% to 70% of said first cylindrical drum.

13. The dryer of claim 4 wherein said first cylindrical drum includes a reduced radial section and said second cylinder surrounds said reduced radial section with a corresponding second cylinder reduced radial section.

14. The dryer of claim 1 further comprising a reclaim asphalt shroud circumscribing and enclosing said annular cavity inlet, a selectively openable hatch provided on said shroud wherethrough reclaimed asphalt products may be supplied to said annular cavity through said cavity inlet.

15. The dryer of claim 14 wherein said reclaim asphalt shroud straddles said annular cavity inlet and frictionally engages said second cylindrical drum and said first cylindrical drum, thereby inhibiting air flow between the atmosphere and said annular cavity.

16. The dryer of claim 14 wherein said reclaim asphalt shroud further includes a duct between said hatch and said annular cavity inlet and a trap door pivotally mounted in said duct and adapted to open when reclaimed asphalt products are supplied into said duct.

17. The dryer of claim 16 wherein said trap door includes a counterweight for keeping said door normally closed, and wherein the weight of reclaimed asphalt products on said trap door causes the door to pivot and open.

18. The dryer of claim 16 further comprising means at said annular cavity inlet for moving reclaimed asphalt products introduced thereat longitudinally toward said annular cavity.

19. The dryer of claim 16 further comprising cavity paddles in said annular cavity for lifting reclaimed asphalt products therein as said first cylindrical drum and said second cylinder rotate.

20. The dryer of claim 1 further comprising a plurality of lifting paddles rotating with said first drum and said second cylinder and extending into said back shroud, a semi-circular surface located in said back shroud, whereby heated aggregate and reclaimed asphalt products fall onto said semi-circular surface and are lifted by said lifting paddles to and out through said back shroud outlet.

21. The dryer of claim 1 wherein said second cylinder is attached to and rotates with said first cylindrical drum.

22. The dryer of claim 21 further comprising a reclaim asphalt shroud circumscribing and enclosing said annular cavity inlet, a selectively openable hatch provided on said shroud wherethrough reclaimed asphalt products may be supplied to said annular cavity through said cavity inlet.

23. The dryer of claim 22 wherein said reclaim asphalt shroud further includes a duct between said hatch and said annular cavity inlet and a trap door pivotally mounted in said duct and adapted to open when reclaimed asphalt products are supplied into said duct.

24. The dryer of claim 1 wherein said second cylinder surrounds 20% to 70% of said first cylindrical drum.

25. The dryer of claim 1 wherein said first cylindrical drum includes a reduced radial section and said second cylinder surrounds said reduced radial section with a corresponding second cylinder reduced radial section.

* * * * *